(12) United States Patent
Foladare et al.

(10) Patent No.: US 6,377,680 B1
(45) Date of Patent: Apr. 23, 2002

(54) METHOD AND APPARATUS FOR NOISE CANCELLATION

(75) Inventors: Mark Jeffrey Foladare, Kendall Park; Shelley B. Goldman, East Brunswick; David Phillip Silverman, Somerville; Shaoqing Q. Wang; Robert S. Westrich, both of Middletown, all of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/115,310

(22) Filed: Jul. 14, 1998

(51) Int. Cl.[7] .................................. H04B 15/00
(52) U.S. Cl. .................. 379/392.01; 379/391; 704/227
(58) Field of Search ............... 379/387.01, 391–392.01; 381/94.1, 56, 57, 73.1; 704/226–228

(56) References Cited

U.S. PATENT DOCUMENTS 5,524,148 A * 6/1996 Allen et al. ................. 379/391
5,687,285 A * 11/1997 Katayanagi et al. ........ 381/94.1

FOREIGN PATENT DOCUMENTS

| EP | 0 763 888 | * | 3/1997 |
| GB | 2306086 | * | 4/1997 |
| JP | 02-056600 | * | 2/1990 |
| JP | 09-247246 | * | 9/1997 |

* cited by examiner

Primary Examiner—Wing F. Chan
(74) Attorney, Agent, or Firm—Kenyon & Kenyon

(57) ABSTRACT

A method and system for reducing background noise during a telephone call. When a caller begins dialing a telephone number, the system receives an ambient noise level measured near the caller's telephone. The system then computes an inverse noise waveform, which corresponds to the received ambient noise level. The inverse noise waveform is then transmitted along the same telephone line used by the completed call. The inverse noise waveform reduces the ambient background noise from the caller's location for the duration of the telephone call.

8 Claims, 3 Drawing Sheets

METHOD AND APPARATUS FOR NOISE CANCELLATION

FIELD OF THE INVENTION

The present invention relates generally to noise cancellation, and more particularly, to a method and apparatus for reducing background noise during a telephone call.

BACKGROUND INFORMATION

Telephone service is currently available in just about every environment. Telephone calls can be made from mobile or stationary telephones located in a variety of environments including: city street corners, athletic stadiums, and inside an automobile. The environment from which a telephone call is made can hinder the ability of the caller to effectively communicate with the called party. As the background noise level in the environment from which the call is made approaches or exceeds the voice level of one or both parties to a telephone call, one party may not be able to hear the other party's voice.

Some practical solutions applied by telephone customers when background noise levels are interfering with the customer's ability to hear voices over the telephone include: physically moving to an alternate location with lower background noise levels before placing the call and if possible, waiting for the background noise to subside before placing the call. However, there are circumstances when one or more of the above solutions are ineffective or impractical. For example, the nearest alternate pay telephone may be a great distance away from the customer's current location or the noise levels at a construction site may not subside until after construction work ceases at the end of the day.

One technique for reducing background noise during a telephone call is with a headset comprising both a microphone connected to a rotating boom and a speaker. The headset speaker is positioned over the user's ear and the rotating boom is positioned so the microphone is near the user's mouth. As the user speaks into the microphone during a telephone conversation, the microphone filters out background noise. However, such headsets are intended for use in conjunction with a home or office telephone. This product is not practical for use by someone using a pay telephone near a noisy construction site or near a busy street corner.

Another system which shifts the burden of reducing background noise levels from the telephone customer to the telephone system was developed by AT&T. This system makes a real-time measurement of the background noise level during a call, generates a signal representing the inverse of the measured background noise waveform, and transmits the inverse noise waveform over the telephone line during the telephone call to cancel the measured background noise level. However, this system measures the background noise level after the call is completed. Thus, after completion of the call, there are a few seconds during which background noise levels can interfere with the customer's ability to hear voices over the telephone.

In view of the above, it can be appreciated that there is a need for a system which solves the above described problems by filtering background noise from a telephone call.

SUMMARY OF THE INVENTION

One embodiment of the present invention reduces background noise during a telephone call. After a caller initiates a call by dialing a telephone number, the system receives an ambient background noise level measured at the caller's location. The system then computes an inverse noise waveform, which corresponds to the measured noise level, and transmits the inverted noise waveform along the line, which will be used by the completed telephone call. When the ambient background noise level from the caller's location and the computed inverse noise waveform are transmitted along the same line during the completed call, the background noise level from the caller's location is reduced.

DETAILED DESCRIPTION

Figure 1:
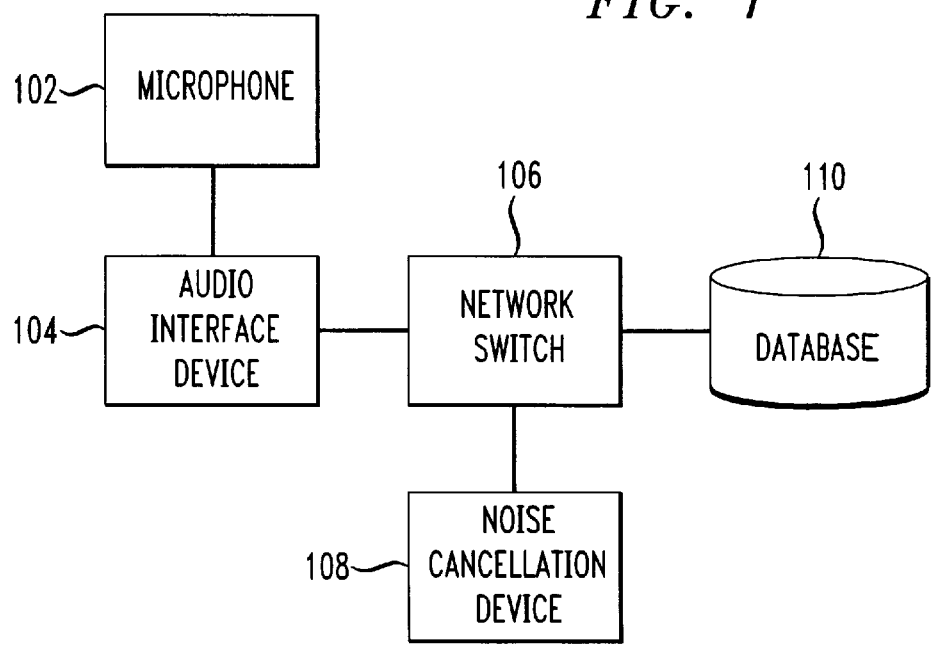
FIG. 1 is a block diagram of a system suitable for practicing one embodiment of the invention.

FIG. 1 is a block diagram of a system suitable for practicing one embodiment of the invention. As shown in FIG. 1, a microphone 102 is connected to an audio interface device 104 (e.g., a telephone). Telephone 104 is connected to a network switch 106. Network switch 106 can be one of any number of public switches that are part of the Public Switched Telephone Network (PSTN), or a private switch such as a private branch exchange (PBX). A database 110 is connected to network switch 106. A noise cancellation device 108 (e.g., Lucent Technologies Definity) is also connected to network switch 106.

One method for reducing background noise during a telephone call will now be explained with reference to FIG. 1. Microphone 102 is placed adjacent to telephone 104. When a customer picks up the receiver of telephone 104 and begins dialing a telephone number, microphone 102 begins recording the ambient background noise level near the caller's telephone. The recorded background noise level is transmitted to noise cancellation device 108 via network switch 106. Noise cancellation device 108 then generates a noise canceling inverse waveform in a known manner and transmits the inverse waveform along the telephone line before the telephone call is completed. After the telephone call is completed and the background noise from the caller's environment and the inverse waveform are simultaneously transmitted along the same telephone line, the background noise from the caller's environment is reduced. If a background noise waveform is not received prior to completion of the call, the call is completed without noise reduction. In an alternative embodiment, completion of a call may be delayed long enough to ensure a background noise canceling inverse noise waveform is transmitted prior to completion of the call.

Once the call is completed, a second noise level may be measured in a known manner. This second noise level is subtracted from the ambient noise level measured using microphone 102. A second waveform, which will reduce the noise level resulting from the subtraction of these two signal levels, is then generated and transmitted along the telephone line of the completed call.

Figure 2:
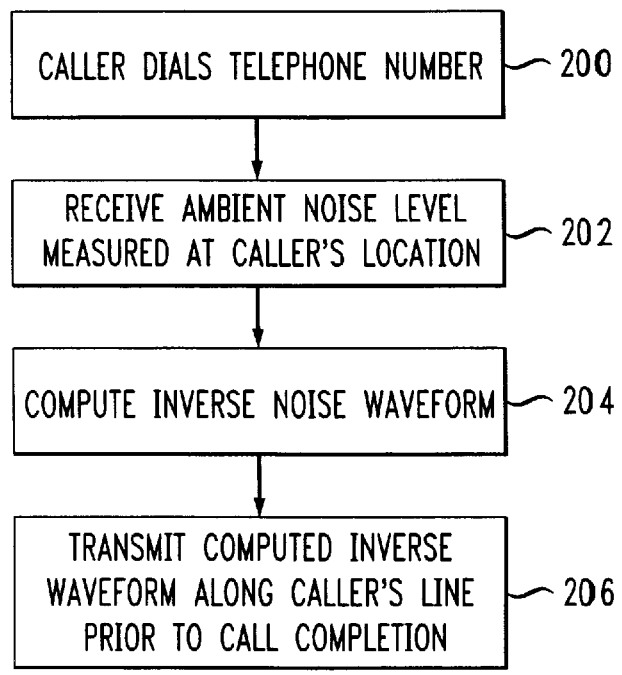
FIG. 2 illustrates a flow chart with steps for reducing noise during a telephone call, in accordance with one embodiment of the invention.

FIG. 2 illustrates a flow chart with steps for reducing noise during a telephone call, in accordance with one embodiment of the invention. These steps may be implemented, for example, as a computer program or as computer hardware using well-known signal processing techniques. If implemented in software, the computer program instructions are stored in computer readable memory, such as Read-Only Memory (ROM), Random Access Memory (RAM), magnetic disk (e.g, 3.5 inch diskette or hard drive), optical disk (e.g., CD-ROM) and so forth. The computer program instructions are executed using a processor using well-known techniques. The computer hardware or software implementing the various embodiments of the invention can be located, for example, in a noise cancellation device described below.

In step 200, a caller initiates a telephone call by dialing a telephone number from a telephone. In step 202, the system determines an ambient noise level measured at the caller's location. In step 204, the system computes an inverse noise waveform, which corresponds to the received ambient noise level. In step 206, the system transmits the inverse noise waveform along the caller's line prior to completion of, or during, the call.

Various techniques are available to measure the noise level and compute the inverse waveform. Examples will be described below.

Figure 3:
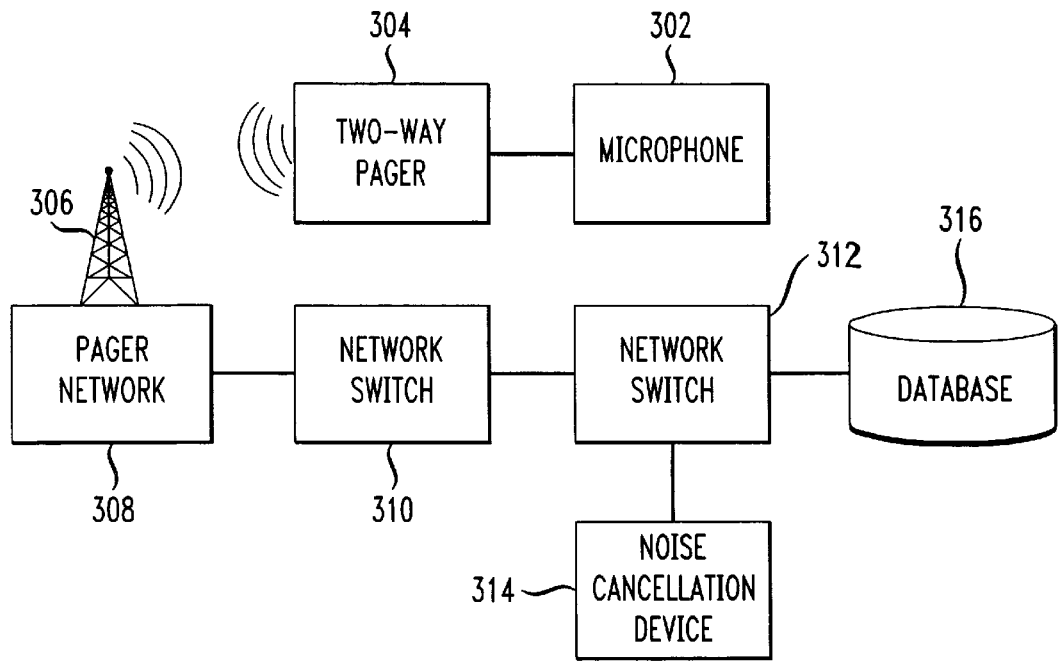
FIG. 3 is a block diagram of a system suitable for practicing an embodiment of the invention using a microphone connected to a 2-way pager.

FIG. 3 is a block diagram of a system suitable for practicing an embodiment of the invention using a microphone connected to a two-way pager. A microphone 302 is connected to a two-way pager 304 (e.g., which includes a means such as a processor for receiving a noise signal recorded with microphone 302, processing the received noise signal, and transmitting the processed signal via an existing transmitter within the pager; two-way pager 304 could also be a cellular telephone similarly equipped). Microphone 302 may be attached to the pager customer's clothing at a location away from two-way pager 304. A pager tower 306 is connected to a pager network 308. Pager network 308 is connected to a noise cancellation device 314 (as described with reference to FIG. 1) via network switches 310 and 312 (described with reference to FIG. 1). A database 316 is connected to network switch 312.

The embodiment illustrated in FIG. 3 may be implemented, for example, using a known subscription service such as the Personal Reach Service offered by the AT&T Corporation. Subscribers to this service are assigned a personal meet me 800 telephone number, a pager which alerts the subscriber to an incoming call when the meet me 800 number is dialed by a caller, and a subscriber number (also referred to as a revertive number). A user who wishes to place a call to a Personal Reach Service subscriber first dials the subscriber's meet me 800 telephone number. The Personal Reach Service places the incoming call on hold and sends a page to the pager assigned to the dialed 800 telephone number. Upon receiving the page, the subscriber will locate a telephone and dial into the service using the assigned subscriber number. The service is able to correlate the incoming call from the subscriber with the user's call because both telephone numbers are assigned to the same person. Once the service connects the two calls and takes the user off hold, the user and the subscriber are able talk with each other. Thus, so long as the subscriber is in pager range, subscribers to the Personal Reach Service can receive notice of incoming calls via a pager and answer the incoming call by dialing into the system using the nearest telephone.

To implement the embodiment of FIG. 3, a caller first uses a telephone attached to a telephone network to dial the personal 800-telephone number assigned to a subscriber. The user's call is received at switch 312 and then routed to noise cancellation device 314. At switch 312, the Personal Reach Service places the user on hold and sends a page to the pager assigned to the dialed 800-telephone number. Pager network 308, using pager tower 306, then transmits a page to two-way pager 304. Two-way pager 304 is programmed in a known manner to respond to the 800-telephone number dialed by the caller. When two-way pager 304 receives the page from pager tower 306, microphone 302 begins recording the ambient background noise level in the area around the subscriber. This recorded noise level and a cap code identifying two-way pager 304 are both transmitted to noise cancellation device 314 via pager tower 306, pager network 308 and network switches 310 and 312. Alternatively, pager network 308 may decode the cap code and transmit the identity of the subscriber to noise cancellation device 314 with the recorded noise waveform rather than transmitting the actual cap code with the recorded noise waveform. Upon receiving the recorded noise level, noise cancellation device 314 computes a corresponding inverse noise waveform and transmits this inverse noise waveform and the cap code to network switch 312.

Upon receiving the page, the subscriber assigned to two-way pager 304 will locate a telephone and dial into the telephone network using his or her assigned subscriber number. The subscriber's call is received at switch 312. Using the cap code received from noise cancellation device 314 and the assigned subscriber number, switch 312 correlates the inverse noise waveform with the incoming call from the subscriber. Before connecting the subscriber's call with the caller (who is placed on hold by the Personal Reach Service until the subscriber dials into the telephone network) noise cancellation device 314 begins transmitting the inverse noise waveform along the line which will be used by the completed call between the subscriber and the caller.

In a manner similar to this embodiment, a pager with an attached microphone could periodically transmit an ambient noise level measurement to noise cancellation device 314. Noise cancellation device 314 will then compute a new inverse noise waveform upon receiving each periodic ambient noise measurement. The advantage of this embodiment is that an inverse noise waveform based upon the most recent ambient noise measurement received from the subscriber's location will be computed and ready for transmission before a caller dials the subscriber's personal 800-telephone number.

Figure 4:
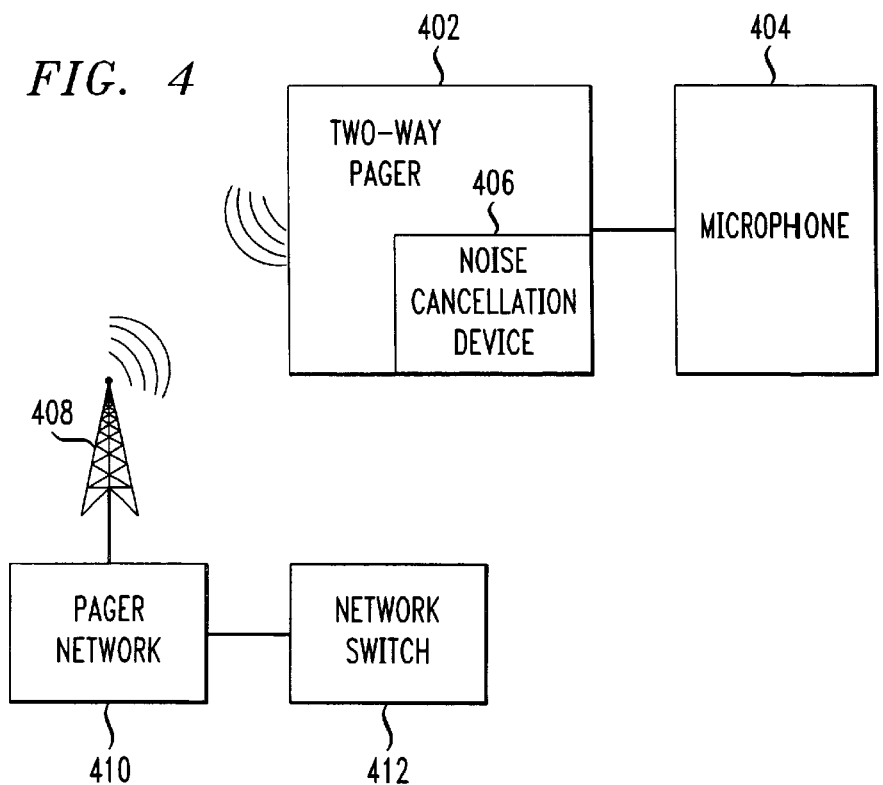
FIG. 4 is a block diagram of a system suitable for practicing an embodiment of the invention using a noise cancellation device within a 2-way pager.

FIG. 4 is a block diagram of a system suitable for practicing an embodiment of the invention using a noise cancellation device within a 2-way pager. A two-way pager 402 (described with reference to FIG. 3) includes a noise cancellation device 406 (described with reference to FIG. 1) and a microphone 404 (described with reference to FIG. 1). A pager network 410 is connected to a pager tower 408 (both described with reference to FIG. 3) and a network switch 412 (slightly modified from the switch described with reference to FIG. 1).

This embodiment is implemented in a manner similar to the example of FIG. 3 above (using the AT&T Personal Reach Service) except that the inverse noise waveform is computed within two-way pager 402 using an ambient noise level measurement received from microphone 404. Two-way pager 402 transmits its assigned cap code and the computed inverse noise waveform to switch 412 via pager network 410. Switch 412 is modified to use the received cap code to correlate the received inverse noise waveform with the call placed by the subscriber and to begin transmitting the inverse noise waveform along the appropriate line before connecting the caller and the subscriber.

In an embodiment similar to that described with reference to FIG. 4, a noise cancellation device could be included within a cellular telephone. According to this embodiment, the noise cancellation device would cancel the background noise by merging the user's voice path and the inverse noise waveform at the cellular telephone mouthpiece. Rather than record the background noise using a microphone prior to computing an inverse waveform, according to this embodiment, a noise cancellation device would invert the background noise waveform in real-time.

Figure 5:
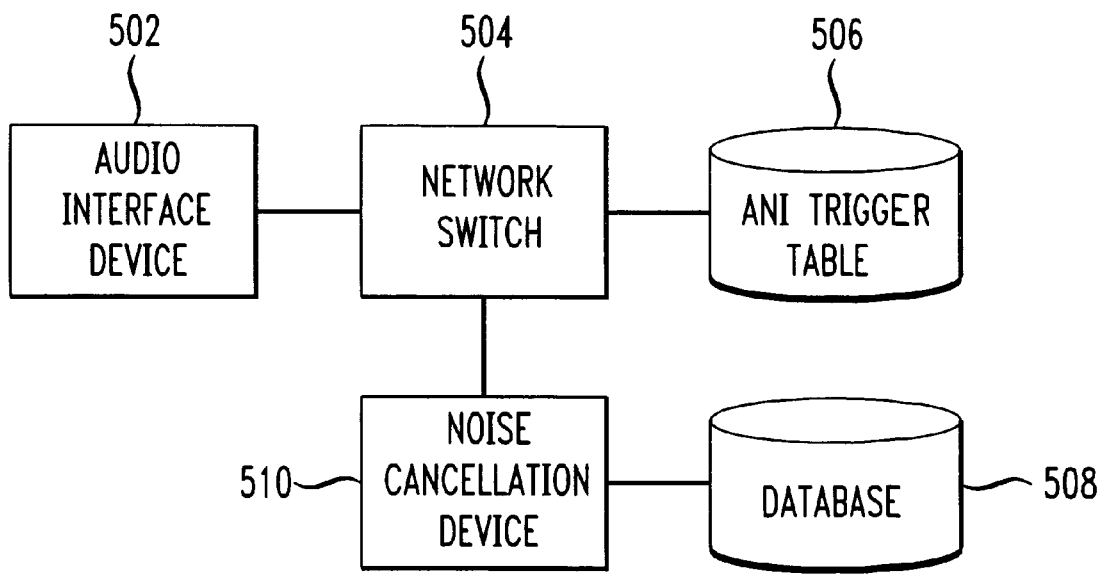
FIG. 5 is a block diagram of a system suitable for practicing an embodiment of the invention using an automatic number identifier (ANI) trigger table.

FIG. 5 is a block diagram of a system suitable for practicing an embodiment of the invention using an ANI trigger table. An audio interface device 502 (e.g., a telephone) and a noise cancellation device 510 (as described with reference to FIG. 1) are connected to a network switch 504 (as described with reference to FIG. 1). Network switch 504 is also connected to a database 506 (e.g., an ANI trigger table) and a database 508.

This embodiment eliminates the step of constantly measuring an ambient noise level prior to computing an inverse noise waveform and thus increases the chance that an inverse waveform can be computed without unnecessarily delaying completion of a telephone call. If a stationary telephone is located near a consistently noisy location, an ambient noise level is measured and stored within a database for use whenever a call is made from that particular telephone. In FIG. 5, all calls arriving at network switch 504 are checked against ANI trigger table 506. If ANI trigger table 506 includes a marker for the telephone from which the call originated, the system checks database 508 for a pre-recorded ambient noise level associated with that particular telephone. Using this pre-recorded ambient noise level, noise cancellation device 510 generates an inverse noise waveform to cancel the known ambient noise level at that particular telephone.

Although various embodiments are specifically illustrated and described herein, it will be appreciated that modifications and variations of the present invention are covered by the above teachings and within the purview of the appended claims without departing from the spirit and intended scope of the invention. For example, the recorded ambient noise level may be transmitted in either digital or analog form.

What is claimed is:

1. A method for reducing noise during a telephone call, comprising the steps of:
   receiving a first ambient noise level measurement from a caller's location prior to completion of a telephone call by identifying a telephone from which said telephone call originated, wherein the first ambient noise level is associated with said identified telephone;
   computing a first waveform which will reduce said first ambient noise level; and
   transmitting said computed waveform along a line, which will be used by a completed call.

2. The method of claim 1, further comprising the steps of:
   measuring a second ambient noise level over said line;
   subtracting said second ambient noise level from said first ambient noise level thereby creating a third ambient noise level;
   computing a second waveform which will reduce said third ambient noise level; and
   transmitting said second waveform along said line.

3. A method for reducing noise during a telephone call, comprising the steps of:
   identifying a telephone from which said telephone call originated;
   checking a first database for a marker associated with said identified telephone;
   retrieving, from a second database, a pre-recorded ambient noise level associated with said identified telephone if a marker is present in said first database;
   computing a waveform which will reduce said prerecorded ambient noise level; and
   transmitting said computed waveform along a line, which will be used by a completed call.

4. The method of claim 3, further comprising the steps of:
   measuring an ambient noise level over said line used by said completed call;
   subtracting said measured ambient noise level from said pre-recorded ambient noise level retrieved from said second database; and
   transmitting a second waveform along said line used by said completed call, which reduces a noise level resulting from said subtracting step.

5. A computer-readable medium whose contents cause a computer system to reduce noise during a telephone call, by performing the steps of:
   receiving a first ambient noise level measurement from a caller's location prior to completion of a telephone call by identifying a telephone from which said telephone call originate, wherein the first ambient noise level is associate with said identified telephone;
   computing a first waveform which will reduce said first ambient level; and measured ambient noise level; and
   transmitting said computed waveform along a line, which will be used by a completed call.

6. The computer-readable medium of claim 5, further performing the steps of:
   measuring a second ambient noise level over said line;
   subtracting said second ambient noise level from said first ambient noise level thereby creating a third ambient noise level;
   computing a second waveform which will reduce said third ambient noise level; and
   transmitting said second waveform along said line.

7. A computer-readable medium whose contents cause a computer system to reduce noise during a telephone call, by performing the steps of:
   identifying a telephone from which said telephone call originated;
   checking a first database for a marker associated with said identified telephone;
   retrieving, from a second database, a pre-recorded ambient noise level associated with said identified telephone if a marker is present in said first database;
   computing a waveform which will reduce said prerecorded ambient noise level; and
   transmitting said computed waveform.

8. The computer-readable medium of claim 7, further performing the steps of:
   measuring a noise level over said line used by said completed call;
   subtracting said measured ambient noise level from said pre-recorded ambient noise level retrieved from said second database; and
   transmitting a second waveform along said line used by said completed call which reduces a noise level resulting from said subtracting step.

* * * * *